(No Model.) 2 Sheets—Sheet 1.

C. KONOLD.
MACHINE FOR MAKING VISE JAWS.

No. 337,340. Patented Mar. 2, 1886.

Witnesses
J. A. Burns.
J. K. Smith

Inventor
Christian Konold
by his attys
Bakewell & Kerr (No Model.) 2 Sheets—Sheet 2.

C. KONOLD.
MACHINE FOR MAKING VISE JAWS.

No. 337,340. Patented Mar. 2, 1886.

Witnesses—
J. A. Burus.
J. K. Smith

Inventor
Christian Konold
by his attys
Bakewell & Kerr

UNITED STATES PATENT OFFICE.

CHRISTIAN KONOLD, OF ROSS, ALLEGHENY COUNTY, PENNSYLVANIA.

MACHINE FOR MAKING VISE-JAWS.

SPECIFICATION forming part of Letters Patent No. 337,340, dated March 2, 1886.

Application filed May 21, 1884. Renewed September 25, 1885. Serial No. 178,170. (No model.)

*To all whom it may concern:*

Be it known that I, CHRISTIAN KONOLD, of Ross township, in the county of Allegheny and State of Pennsylvania, have invented a new and useful Improvement in Machines for Making Vise-Jaws; and I do hereby declare the following to be a full, clear, and exact description thereof.

Heretofore vise-jaws have commonly been made by hand-forging. A suitable bar of iron was taken, heated, and then the end split and drawn out laterally to form a T at one side and a spur at the other. A flat piece of iron constituting the body was then welded to one side of the T, and then a piece of steel was welded to the face of the iron to form a hard bit. In some cases the steel was welded to the iron, and then the latter was welded to the T. This operation was not only slow and involved a large amount of labor, but the frequent reheating of the metal was injurious thereto, and especially to the steel bit. The jaw so produced, being composed of a number of pieces welded together, did not have the requisite strength, and was liable to show defects after finishing and in use, which defects were frequently the cause of breakage.

My invention consists of improved appliances for making vise-jaws of a single piece of metal, with the exception of the steel bit, which, being of a different character of material, is subsequently welded thereto.

To enable others skilled in the art to make and use my invention, I will now describe it by reference to the accompanying drawings, forming a part of this specification, in which—

Figure 1:
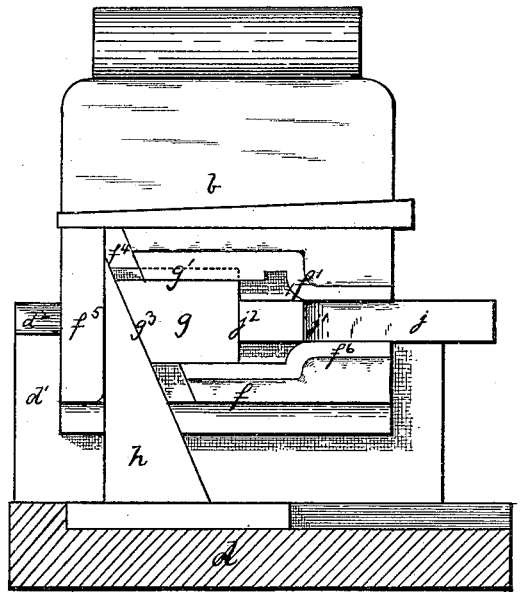
Figure 2:
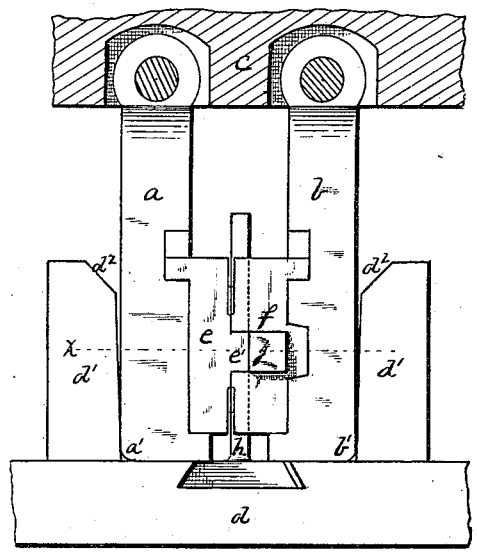
Figure 5:
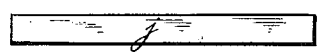
Figure 6:
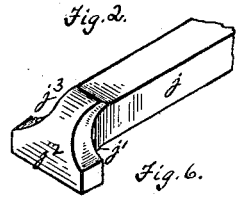
Figure 3:
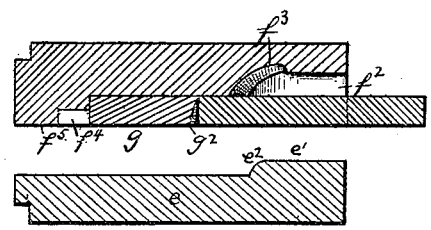
Figure 4:
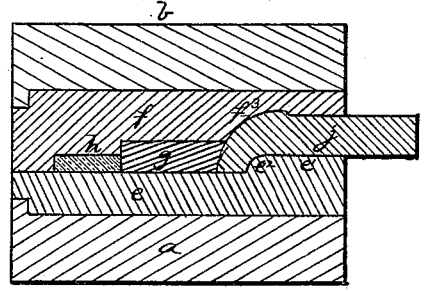
Figure 12:
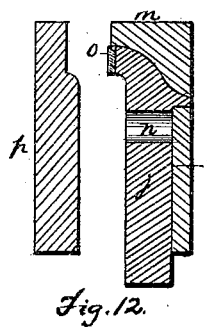
Figure 7:
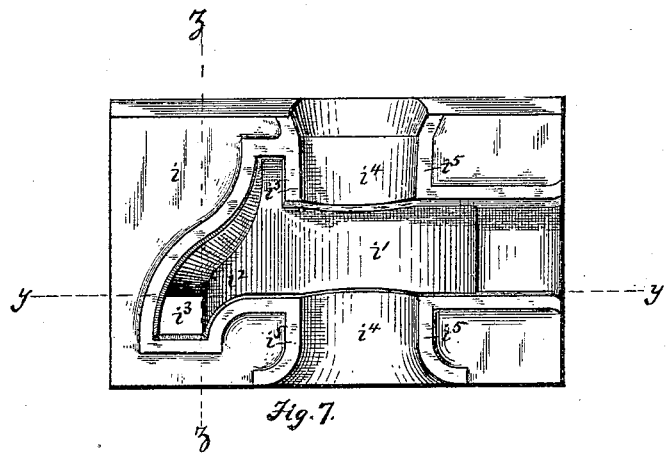
Figure 8:
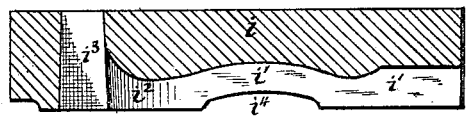
Figure 9:
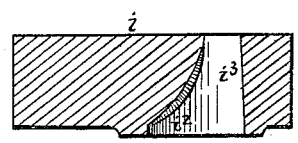
Figure 11:
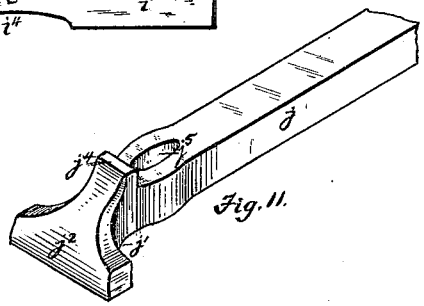
Figure 10:
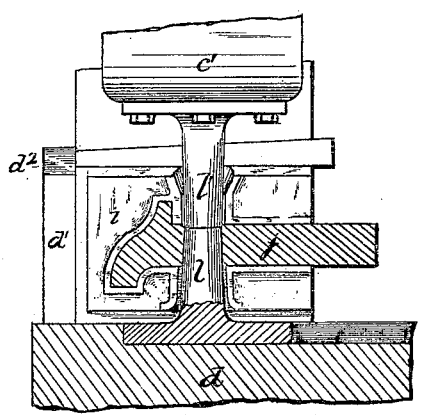

Figure 1 is a side view of a portion of my improved machine, showing the bar of metal in position after having been subjected to the first operation. Fig. 2 is an end view of a portion of the machine, showing the position of the parts at the close of the second step in the operation. Fig. 3 is a sectional view of the first pair of dies after the insertion of the blank, and before the same have acted upon the bar. Fig. 4 is a longitudinal section on the line $x\ x$ of Fig. 2. Fig. 5 is a view of the bar. Fig. 6 is a view of the same after having passed through the operation indicated in Figs. 1 to 4. Fig. 7 is a face view of one of a pair of dies to which the blank shown in Fig. 6 is next submitted, the companion die being of similar form. Fig. 8 is a longitudinal sectional view on the line $y\ y$, Fig. 7. Fig. 9 is a cross-sectional view on the line $z\ z$ of Fig. 7. Fig. 10 is a view illustrating the punching of the eye in the blank while held between a pair of dies like that shown in Fig. 7. Fig. 11 is a view of the blank after having been submitted to the action of the dies shown in Figs. 7 to 10. Fig. 12 is a longitudinal sectional view of a pair of finishing and bit-welding dies, and illustrates the last operation in the formation of the jaw.

Like letters of reference indicate like parts in each.

The mechanism is composed of a series of dies which operate successively upon the blank, constituting a series of continuous steps or operations through which the blank must be put before it is brought to its final form.

In Fig. 2 I show a pair of die-carriers, $a\ b$, which are pivoted to a reciprocating head, $c$, which moves preferably in a vertical direction. Below the dies is a bed, $d$, having two uprights or standards, $d'$, each with a short incline, $d^2$, at its inner upper corner, which inclines stand in the path of the die-carriers $a\ b$, so that when the latter descend by the movement of the vertical reciprocating head $c$ their corners $a'$ $b'$, encountering the inclines $d^2$, cause them to be forced together, so that they descend between the vertical sides of the standards $d'$. The die-carriers have secured to their inner faces a pair of dies, $e\ f$. The die $f$ has a recess, $f'$, for receiving the straight bar or blank $j$, back of the line of which is a cavity, $f^2$, having a recess, $f^3$, for imparting the preliminary form to one side of the blank. At the inner end the cavity $f'$ widens out at both sides, so as to give room for the formation of the T-head of the jaw.

Mounted in guides $g'$, in the rear of the cavity $f'$, is a plunger, $g$, the purpose of which is to upset the end of the blank $j$, so as to form the T-head on the end of the jaw. The front end, $g^2$, of the plunger $g$ is slightly concave, so as to form a continuation of the curve of the portion $f^3$ of the cavity of the die $f$. The die $e$ has a plain face, except opposite the portion $f^2$ of the cavity in the die $f$, where it has a projection, $e'$, having a rounded corner, $e^2$, which gives shape to the inner or concave side of the jaw at the point where the head merges into the shank, as shown at $j'$ in Fig. 6.

Near the rear end of the die $f$ is a tapered vertical cavity, $f^4$, the rear side of which is bounded by a shoulder, $f^5$.

Secured to the bed-plate $d$ is a wedge, $h$, in such a position that when the die-carriers $a\ b$ descend between the standards $d'$ it passes into the tapered cavity $f^4$, and acting on the inclined rear end, $g^3$, of the plunger $g$, drives the latter forward in the guide $g'$ and causes it to act against the end $j^2$ of the blank $j$, which is inclosed between the dies $e\ f$.

The operation of these dies is as follows: The bar $j$ is placed in the die $f$, resting upon the lower line, $f^6$, of the straight portion of the cavity $f'$, before the die-carriers have passed between the inclines $d^2$. As the head $c$ descends, the inclines $d^2$, acting upon the die-carriers $a\ b$, cause the dies to close, whereby the projection $e'$ is caused to force the body of the bar into the cavities $f^2\ f^3$, communicating the shape of the same thereto. The continued descent of the dies causes the wedge $h$ to act on the plunger $g$ and force it forward against the end of the bar $j$, and to upset the same into the widened portion of the cavity $f'$. This operation imparts to the straight bar $j$, Fig. 5, the form shown in Fig. 6, where the blank has a T-head, $j^2$, extending laterally beyond the line of one side of the shank, and a projection, $j^3$, on the opposite side, which is designed to be ultimately worked into a spur, $j^4$. (Shown in Fig. 11.) The blank shown in Fig. 6 is next submitted to the action of a pair of dies, $i$, such as is shown in Figs. 7, 8, 9, and 10. These dies are similar in form and have a main cavity, $i'$, in which the shank of the blank rests, merging, as at $i^2$, into a cross-cavity, $i^3$, which receives the T-head. The cross-cavity extends through the die in a lower horizontal plane than that occupied by the main cavity $i'$, for the reason that the T-head extends laterally beyond the adjacent side of the shank.

Extending through the dies at right angles to the cavity $i'$ is a cavity, $i^4$, bounded by walls $i^5$, designed for the passage of the punches which form the eye or hole $j^5$ in the shank of the vise-jaw. I prefer to use two narrow punches, $l\ l'$, as shown in Fig. 10, one of which is mounted on the bed-plate $d$, and the other on a reciprocating head, $c'$. The dies $i$ are mounted on die-carriers $a\ b$, similar to the dies $e\ f$ in Fig. 2, and are closed on the blank by inclines $d^2$ on the inner upper edges of standards $d'$, similar to the construction shown in Fig. 2. The cavities $i'$, $i^2$, and $i^3$ are narrower than the blank shown in Fig. 6, so that the operation of the dies $i$ and of the punches $l\ l'$ brings the vise-jaw a step nearer to its final form, the displaced metal going to lengthen out the T-head $j^2$ and to form the spur $j^4$. The blank, after this operation, requires only to be put through a finishing-die for the purpose of finishing its sides and of enlarging and truing the eye and welding the steel bit to the biting-edge of the jaw. Such a die is shown at $m$ in Fig. 12. This die has a cavity, $m'$, of the shape of the finished jaw, and a pin, $n$, for finishing the eye. Prior to being placed in the die $m$ the blank is brought to the proper heat, and a steel bit, $o$, is stuck on the straight face of the jaw. Then the blank is placed in the die and is subjected to the action of a press or plunger, $p$, which, acting thereon, finishes it and welds the steel bit $o$ to the jaw.

By means of the devices just described I am enabled to make a vise-jaw of one piece of metal, with the exception, as stated, of the steel face or bit, and consequently avoid the defects arising from imperfect welds and transversely-extending fibers in the separate pieces of metal which together constitute the jaw as formerly constructed. I also avoid the slow and tedious hand process heretofore practiced. I also obtain great uniformity of product and superior finish, greater trueness in the article, and an enormously increased product from the labor of a given number of men.

I do not limit myself to the exact construction of the devices shown.

It is apparent to the skilled mechanic that the form of the plunger $g$ and of the wedge $h$ may be modified in several ways without departing from the spirit of the invention. For instance, the plunger could be attached to a die-carrier similar to those shown in Fig. 2, and suspended from the head $c$, and this die-carrier could be operated by means of a standard, $d'$, having an incline, $d^2$, placed at the rear end of the die-cavity.

By simply changing the form of the dies to suit, my improved machine is applicable to the manufacture of wrench-heads, vise-pins, bridge-links, certain kinds of ax-polls, and similar articles, and I claim its use for such purposes.

I do not herein claim the dies $e$, $f$, and $i$, for the reason that they form the subject of another application filed September 25, 1885.

What I claim as my invention, and desire to secure by Letters Patent, is—

1. In a machine for manufacturing vise-jaws and similar articles, the combination of a reciprocating head having dies secured thereto by pivoted die-carriers, and inclined surfaces for forcing said dies together, with a plunger operating longitudinally of the die-cavity by means of an inclined surface to upset the end of the blank after the same has been gripped between the dies, substantially as and for the purposes described.

2. The combination of the dies $e\ f$, plunger $g$, and incline $h$, substantially as and for the purposes described.

In testimony whereof I have hereunto set my hand this 12th day of May, A. D. 1884.

CHRISTIAN KONOLD.

Witnesses:
W. B. CORWIN,
THOMAS B. KERR.